(12) United States Patent
Shimizu

(10) Patent No.: US 6,942,278 B2
(45) Date of Patent: Sep. 13, 2005

(54) AUTOMOTIVE DOOR SASH CONSTRUCTION

(75) Inventor: Kentaro Shimizu, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/269,941

(22) Filed: Oct. 15, 2002

(65) Prior Publication Data

US 2003/0071482 A1 Apr. 17, 2003

(30) Foreign Application Priority Data

Oct. 16, 2001 (JP) ..................... P. 2001-318586

(51) Int. Cl.$^7$ ............................... B60J 10/00
(52) U.S. Cl. ................... 296/146.9; 49/475.1
(58) Field of Search ............ 296/146.9, 146.2; 49/490.1, 493.1, 475.1

(56) References Cited

U.S. PATENT DOCUMENTS

| | | | | |
|---|---|---|---|---|
| 4,625,459 A | * | 12/1986 | Warner | 49/489.1 |
| 4,653,230 A | * | 3/1987 | Seo et al. | 49/502 |
| 5,027,556 A | * | 7/1991 | Ginster | 49/441 |
| 5,317,835 A | * | 6/1994 | Dupuy et al. | 49/441 |

FOREIGN PATENT DOCUMENTS

| | | | |
|---|---|---|---|
| JP | 362012417 | * | 1/1987 |
| JP | 2-29824 U | | 2/1990 |
| JP | 406278461 | * | 10/1994 |

* cited by examiner

*Primary Examiner*—H. Gutman
(74) *Attorney, Agent, or Firm*—Sughrue Mion, PLLC

(57) ABSTRACT

An automotive door sash construction has a sash main body attached to a door panel main body, an auxiliary sash provided on the sash main body for holding a corner glass and a reinforcement member disposed along the auxiliary sash. The reinforcement member is disposed either on an passenger compartment side or on a non-passenger compartment side of the auxiliary sash.

8 Claims, 7 Drawing Sheets

AUTOMOTIVE DOOR SASH CONSTRUCTION

BACKGROUND OF THE INVENTION

1. Field of the Invention

The present invention relates to an automotive door sash construction including an auxiliary sash for holding a corner glass of a door.

2. Description of the Related Art

An automotive door sash construction including an auxiliary sash is disclosed in, for example, JP-A-2-29824U which is entitled an "Automotive Door Sash Construction". According to what is illustrated and described in FIG. 1 of the publication, since the automotive door sash construction is characterized in that an auxiliary sash 21 (the same reference numeral is used as one used in the publication, which also applies to the following description) is constructed such that a sash inner 23 and a sash outer 24 are welded to an angular pipe 22, the rigidity of the auxiliary sash 21 can be improved by the angular pipe 22.

With the auxiliary sash 21 of the publication, however, the auxiliary sash is extended so largely in a longitudinal direction of a vehicle body by the angular pipe 22 that the cross section of the sash is increased. This eventually affects not only the external appearance of the vehicle but also the visions to the sides from the passenger compartment. Thus, the proposed door sash construction suffers from a problem that the field of view of the driver is narrowed to such an extent that the driver feels difficulty in driving the vehicle.

SUMMARY OF THE INVENTION

Then, an object of the invention is to provide an automotive door sash construction which can improve the external appearance of the vehicle, as well as the field of view from the passenger compartment, while securing a predetermined rigidity.

With a view to attaining the object, according to a first aspect of the invention, there is provided an automotive door sash construction comprising a sash main body attached to a door panel main body, an auxiliary sash provided on the sash main body for holding a corner glass and a reinforcement member disposed along the auxiliary sash, wherein the reinforcement member is disposed on the auxiliary sash either on a passenger compartment side or on a non-passenger compartment side thereof.

Since the reinforcement member is disposed on the passenger compartment side or on the non-passenger compartment side of the auxiliary sash, the longitudinal dimension or the width of the auxiliary sash is reduced. Consequently, the field of view from the passenger compartment is improved.

According to a second aspect of the invention, there is provided an automotive door sash construction as set forth in the first aspect of the invention, wherein the reinforcement member is disposed on the passenger compartment side of the auxiliary sash.

Since the reinforcement member is disposed on the passenger compartment side of the auxiliary sash, the irregularities on the external side of the vehicle are reduced, and this helps flush the external surface of the vehicle further, thereby improving the external appearance of the vehicle.

In addition, since the reinforcement member is disposed on the passenger side of the auxiliary sash, the internal appearance of the door trim is also improved by designing the configuration of the reinforcement member as wished.

According to a third aspect of the invention, there is provided an automotive door sash construction as set forth in the first or second aspect of the invention, wherein the reinforcement member is secured to the sash main body and/or the door panel main body through welding.

Since the reinforcement member is secured to the sash main body and/or the door panel main body through welding, there is eliminated a case where fixing members as well as bolts and nuts protrude from the sash main body and/or the door panel main body, and therefore, the workability in mounting a door glass and a corner glass can be improved.

In addition, since the reinforcement member is secured to the sash main body and/or the door panel main body through welding, the reinforcement member can be provided integrally between the sash main body and the door panel main body to ensure the utilization of the rigidity of the reinforcement member.

According to a fourth aspect of the invention, there is provided an automotive door sash construction as set forth in the first, second or third aspect of the invention, wherein a joint portion between the auxiliary sash and the reinforcement member is covered with a run channel provided on the auxiliary sash for a door glass or a corner glass seal provided on the auxiliary sash for a corner glass.

Since the front face of the joint portion is covered with the corner glass seal while the rear face thereof is covered with the run channel, the joint portion becomes invisible, thereby improving not only the external appearance of the vehicle but also the internal appearance of the door trim.

DETAILED DESCRIPTION OF THE PREFERRED EMBODIMENTS

Figure 1:
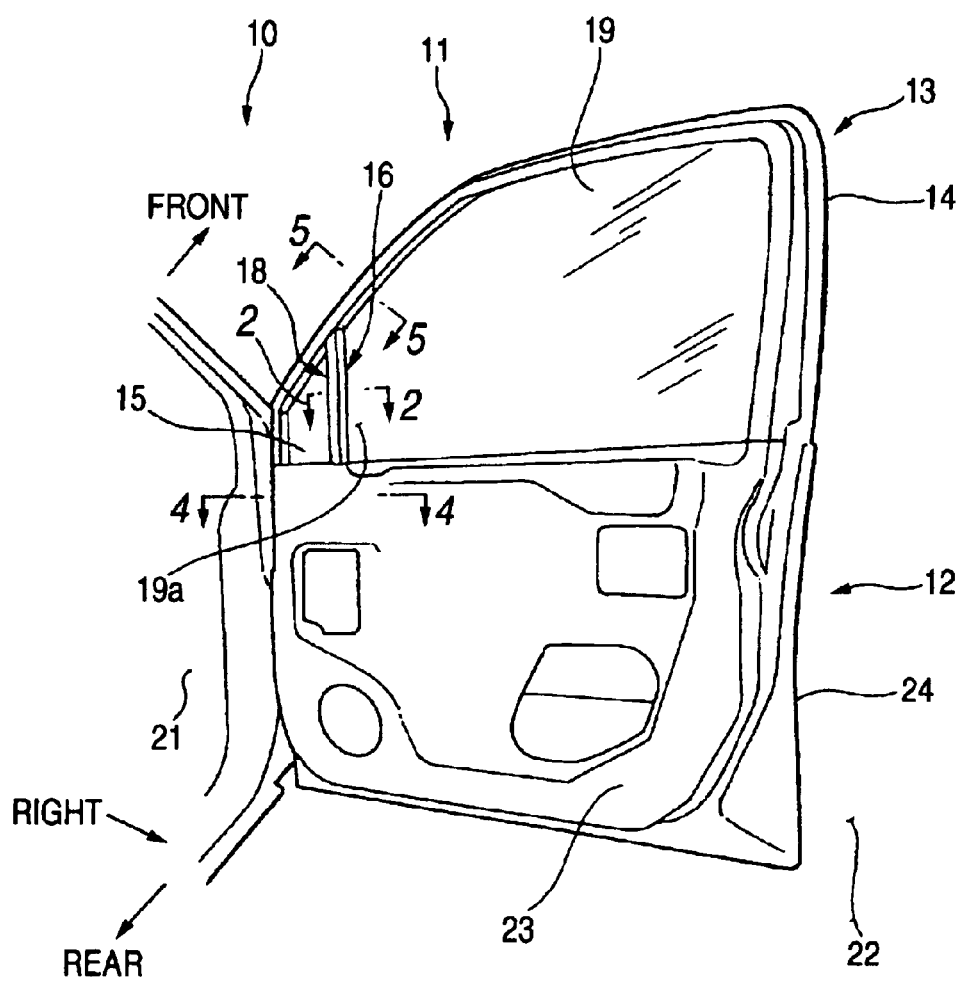
FIG. 1 is a perspective view of a door according to the invention.

An embodiment of the invention will be described below with reference to the accompanying drawings, which are to be seen in a direction in which reference numerals imparted therein are oriented. As used herein, "left" and "right" mean leftward and rightward directions as viewed from the driver's seat, "front" means a direction in which the vehicle advances, and "rear" means reverse to what is meant by the "front".

FIG. 1 is a perspective view of an automotive door according to the invention. A door 11 shown in FIG. 1 is a right front door which is attached to the frame of a vehicle 10 via hinges and includes a door panel main body 12 to which the hinges are attached and a door sash 13 provided at an upper portion of the door panel main body 12.

The door sash 13 includes a sash main body 14 attached to the door panel main body 12, an auxiliary sash 16 extended from the sash main body 14 to the door panel main body 12 for holding a corner glass 15 and a reinforcement member 18 disposed to confront the auxiliary sash 16 via a joint portion 17 (refer to FIG. 2) provided therebetween. Reference numeral 19 denotes a door glass, 19a: a front end portion of the door glass 19, 21: a passenger compartment side and 22: a non-passenger compartment side.

The door panel main body 12 is such that an inner panel 23 and an outer panel 24 are assembled together through welding with a space being provided between the inner and outer panels 23, 24 for receiving a component such as the door glass 19.

Figure 2:
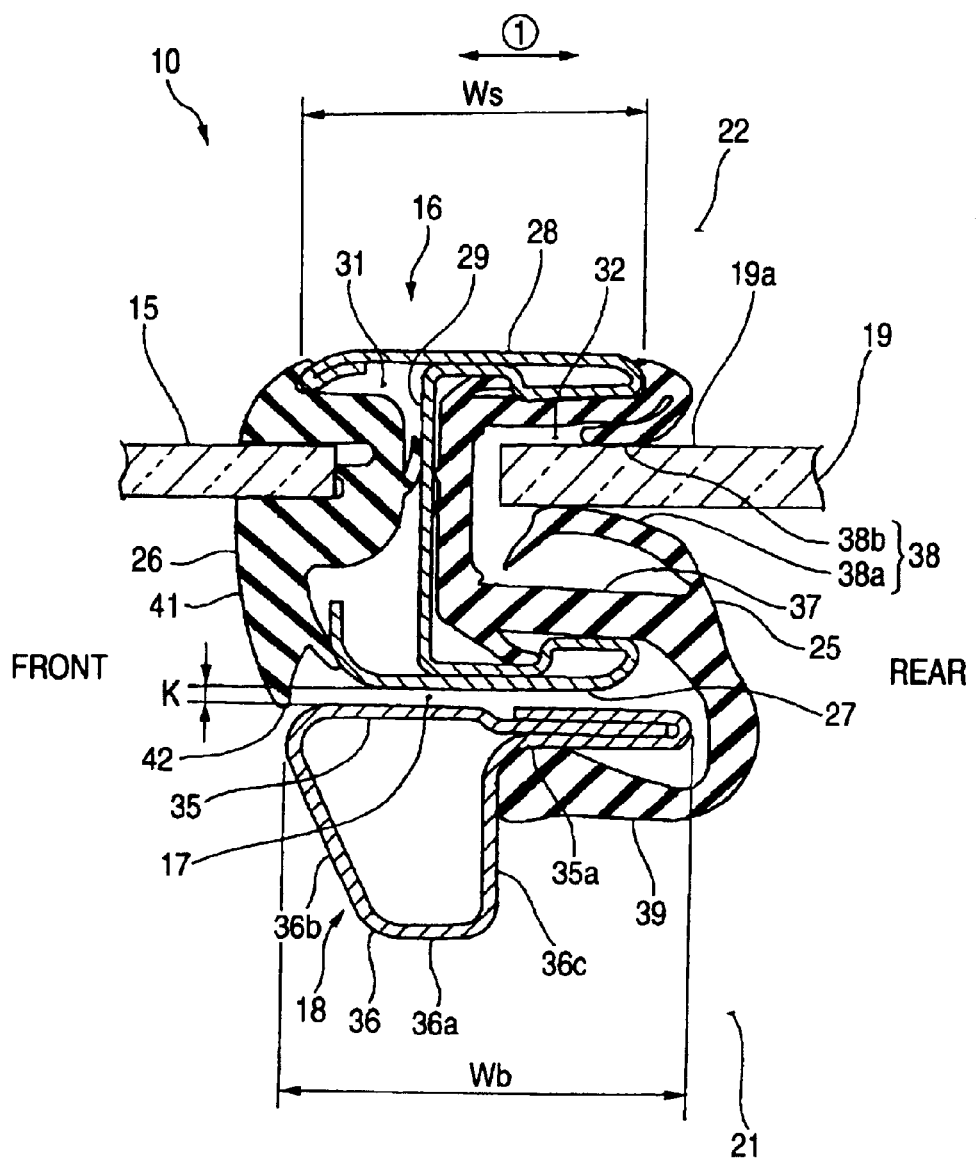
FIG. 2 is a sectional view taken along the line 2—2 in FIG. 1.

FIG. 2 is a sectional view taken along the line 2—2 in FIG. 1, which shows that the front end portion 19a of the door glass 19 is fitted slidably in a rear portion of the auxiliary sash 16 while the corner glass 15 is fitted in a front portion thereof, and the joint portion 17 is provided on the passenger compartment side 21 of the auxiliary sash 16 for placement of the reinforcement member 18. FIG. 2 also shows that a run channel 25 and a corner glass seal 26 are attached to the auxiliary sash 16.

The joint portion 17 is designed to have a predetermined gap K between the auxiliary sash 16 and the reinforcement member 18.

Figure 3:
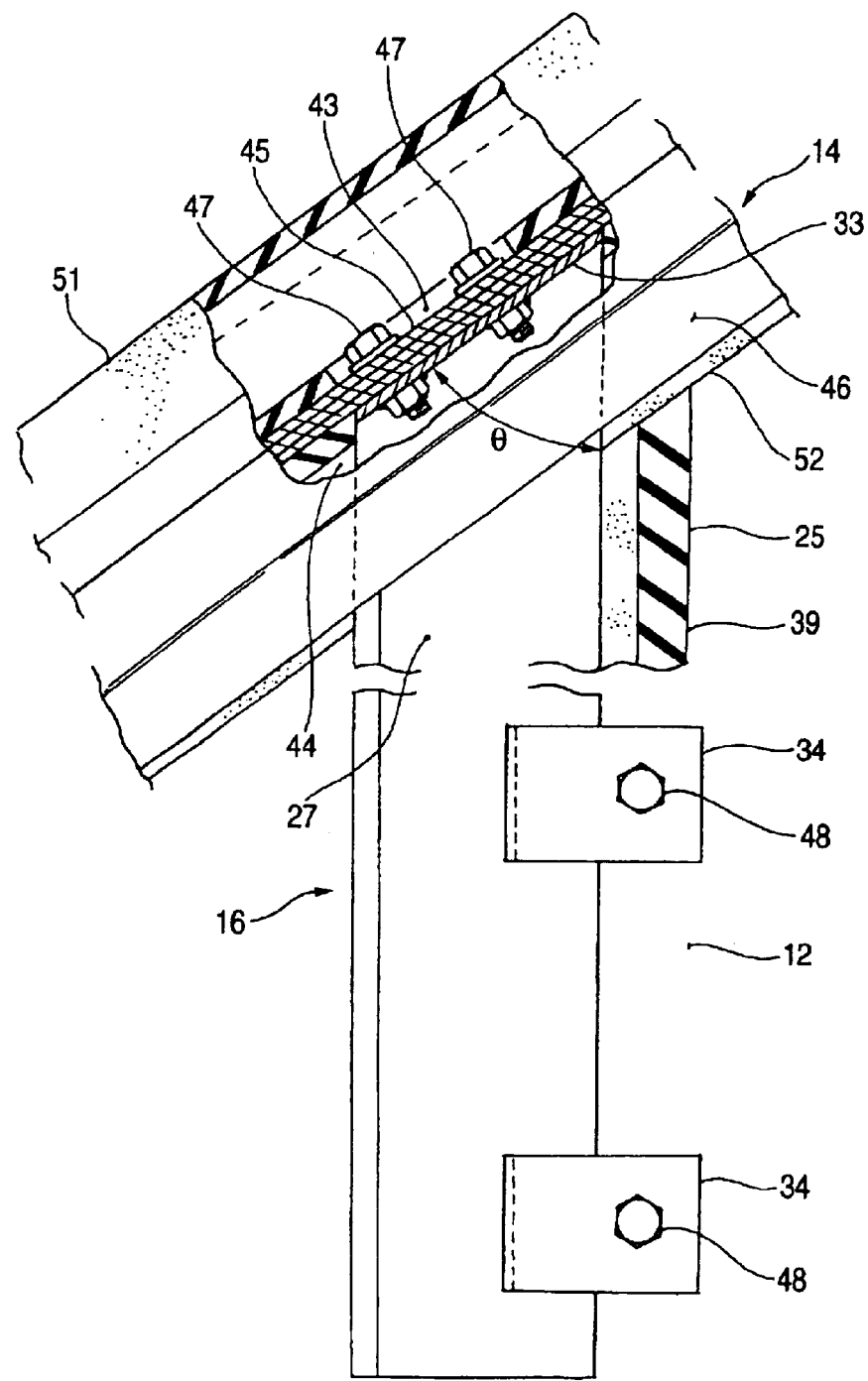
FIG. 3 is a side view of an auxiliary sash according to the invention.

The auxiliary sash 16 is such that a thin blank material is formed into a configuration having an H-shaped cross section. An inboard portion 27 and an outboard portion 28 are formed in such a manner as to extend in the longitudinal direction, and a rib portion 29 is formed between the inboard and outboard portions 27, 28, to thereby form a front recessed portion 31 for fitment of the corner glass seal 26 and a rear recessed portion 32 for fitment of the run channel 25. In addition, as shown in FIG. 3, a top plate 33 is attached to a top portion of the auxiliary sash 16 and lugs 34, 34 are provided on lower portions thereof. The width of the auxiliary sash 16 is set to Ws.

The reinforcement member 18 is such that a thin blank material is formed into a configuration having a b-shaped cross section. A plate portion 35 is provided to extend in the longitudinal direction, and a projecting portion 36 is provided continuously from the plate portion 35. A hook portion 35a is formed on the plate portion 35.

The projecting portion 36 includes a first side 36a, a second side 36b and a third side 36c.

The width of the reinforcement member 18 is set to Wb, which is substantially the same as Ws in a longitudinal dimension.

The run channel 25 includes a main body portion 37, a seal portion 38 (including an inboard seal portion 38a and an outboard seal portion 38b) formed on the main body portion 37 and a lip portion 39 extending from the main body portion 37 in such a manner as to have a U-shaped cross section.

The corner glass seal 26 includes a main body portion 41 and a cover portion 42 formed on the passenger compartment side 21 of the main body portion 41.

FIG. 3 is a side view of the auxiliary sash according to the invention, showing the inboard portion 27 of the auxiliary sash 16 which faces the passenger compartment side 21 (refer to FIG. 2), the top plate 33 at an upper position, the lower lugs 34, 34 attached to the inboard portion 27, and the sash main body 14 attached to the auxiliary sash 16.

The sash main body 14 includes a first recessed portion 43 formed in an upper portion, a second recessed portion 44 formed in a lower portion, a rib portion 45 formed at a central portion and a protruding portion 46 formed on the passenger compartment side.

The top plate 33 is inclined at an inclination angle θ which follows the inclination of the sash main body 14 and has attachment holes (not shown in the figure). Reference numerals 47, 47, 48, 48 denote bolts.

Figure 4:
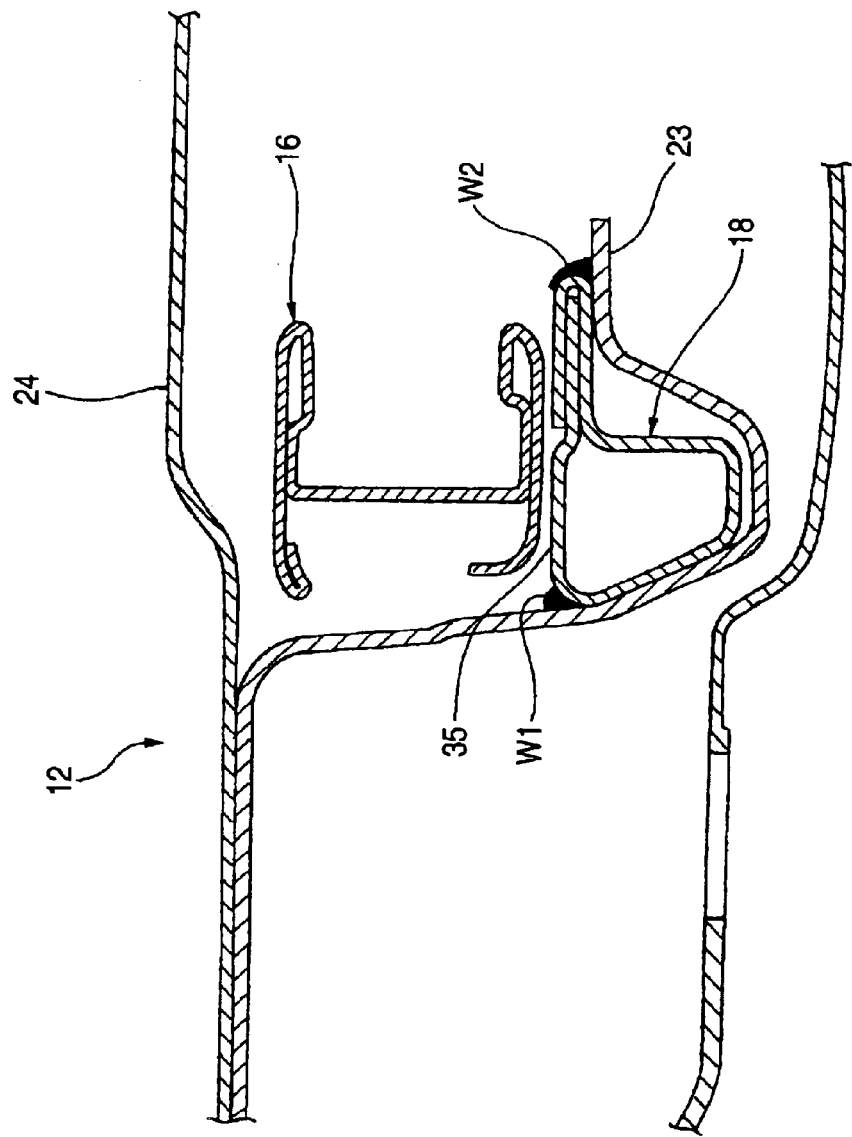
FIG. 4 is a sectional view taken along the line 4—4 in FIG. 1.

FIG. 4 is a sectional view taken along the line 4—4 in FIG. 1 and shows the door panel main body 12 (the inner panel 23 and the outer panel 24), the auxiliary sash 16 bolted to the inner panel 23, and the reinforcement member 18.

In addition, FIG. 4 shows that the plate portion 35 of the reinforcement member 18 is integrally secured to the inner panel 23 of the door panel main body 12 at a lower portion of the plate portion 35 via fillet welds W1, W2.

Figure 5:
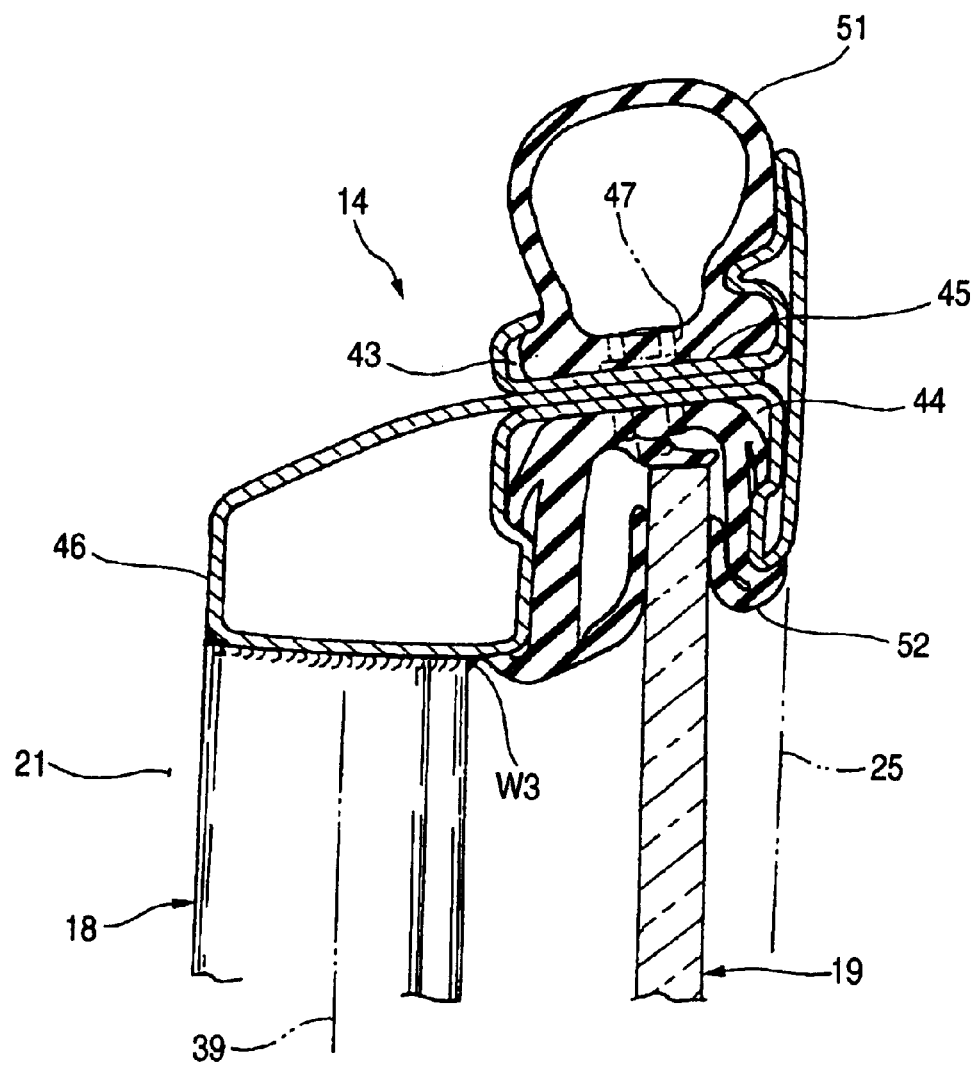
FIG. 5 is a sectional view taken along the line 5—5 in FIG. 1.

FIG. 5 is a sectional view taken along the line 5—5 in FIG. 1 and shows the sash main body 14 (the first recessed portion 43, the second recessed portion 44, the rib portion 45 and the projecting portion 46 formed on the passenger compartment side 21) and the reinforcement member 18, as well as a weather strip 51 fitted in the first recessed portion 43 and a run channel 52 fitted in the second recessed portion 44.

In addition, FIG. 5 shows that the reinforcement member 18 is integrally secured to the projecting portion 46 of the sash main body 14 at upper edges thereof via fillet welds W3.

Next, the assembling procedure of the automotive door sash construction will briefly be described.

Firstly, as shown in FIG. 1, the door panel main body 12 and the sash main body 14 are integrated into each other, and then, as shown in FIGS. 4 and 5, the reinforcement member 18 is secured, respectively, to the door panel main body 12 and the sash main body 14 at ends of the reinforcement member 18 through welding. Following this, the corner glass 15 is set in the corner glass seal 26, and the corner glass 15 and the corner glass seal 26 so set are then attached to the door panel main body 12 and the sash main body 14. Thereafter, a top end portion of the auxiliary sash 16 is attached to the sash main body 14 with bolts 47, 47, and a bottom end portion of the auxiliary sash 16 is attached to the door panel main body 12 with the bolts 48, 48. Finally, a run channel 52 is attached to the sash main body 14, and the run channel 25 is attached to the auxiliary sash 16. As this occurs, as shown in FIG. 2, the lip portion 39 of the run channel 25 is hooked on the hook portion 35a of the reinforcement member 18.

Described next will the function of the automotive door sash construction that has just been described.

Figure 7:
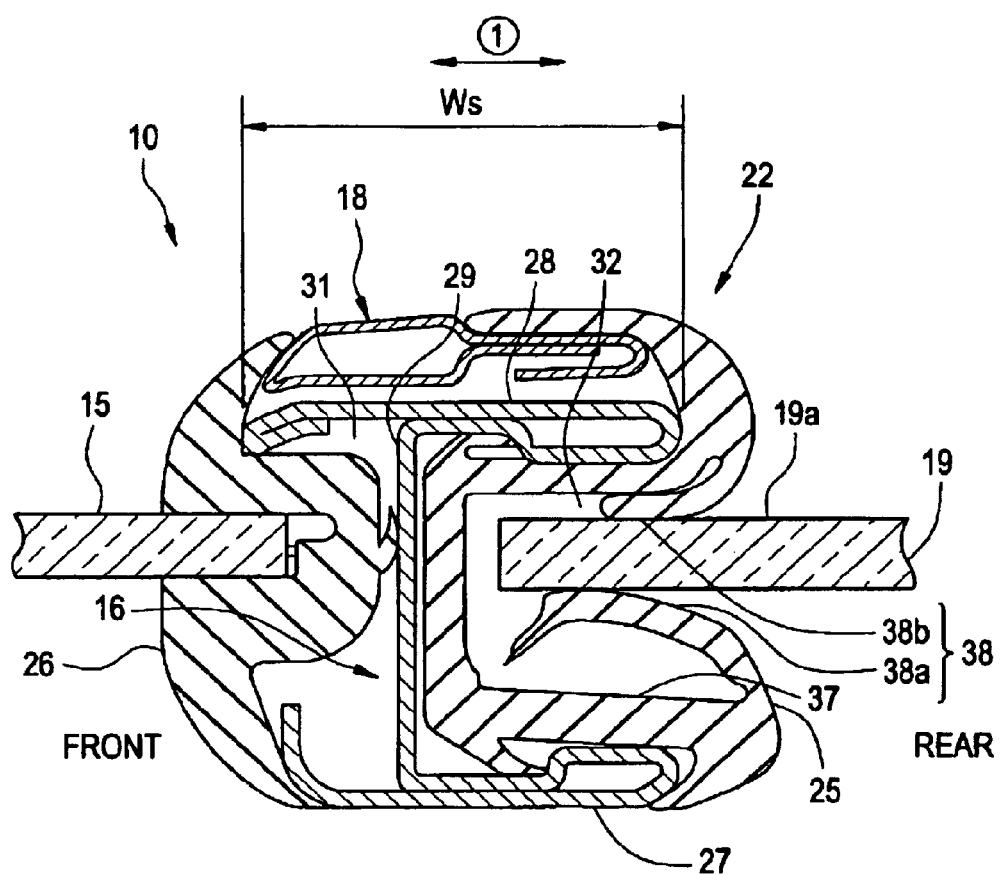
FIG. 7 is a sectional view similar to FIG. 2, except that the reinforcement member is provided on the non-passenger compartment side of the auxiliary sash.

As shown in FIG. 2, in the automotive door sash construction, the reinforcement member 18 is disposed along the auxiliary sash 16 in such a manner that the reinforcement member 18 is provided either on the passenger compartment side 21 or on the non-passenger compartment side 22 of the auxiliary sash 16 (see FIG. 7), whereby the longitudinal dimensions (in direction indicated by arrows 1) of the inboard portion 27 and the outboard portion 28 of the auxiliary sash 16 or the width Ws of the auxiliary sash 16 can be reduced. Consequently, the field of view from the passenger compartment can be improved.

In addition, since the reinforcement member 18 is disposed along the auxiliary sash 16 in such a manner that the reinforcement member 18 is provided either on the passenger compartment side 21 or on the non-passenger compartment side 22 (not shown) of the auxiliary sash 16, in the event that the reinforcement member 18 is attached to the auxiliary sash 16 through welding, there is no case where the assembling performance of the auxiliary sash 16 in the longitudinal directions of the vehicle is damaged, and welding can be adopted for attachment of the reinforcement member 18. As a result, the weight of the door sash of the vehicle can be reduced.

With the automotive door sash construction, since the width Wb of the reinforcement member 18 is set substantially the same as the width Ws of the auxiliary sash 16, the dead angle can be reduced to thereby improve the driver's field of view from the passenger compartment.

As shown in FIG. 2, according to the automotive door sash construction, since the reinforcement member 18 is disposed on the passenger compartment side 21 of the auxiliary sash 16, the external surface of the vehicle 10 can be flushed to thereby improve the external appearance of the vehicle 10.

In addition, since the reinforcement member 18 is disposed on the passenger compartment side 21 of the auxiliary sash 16, the internal appearance of the door trim can also be improved by designing the configuration of the reinforcement member 18 as wished.

As shown in FIGS. 4 and 5, according to the automotive door sash construction, since the auxiliary member 18 is weld secured to the sash main body 14 and the door panel main body 12, there exist no fixing members and bolts and nuts which protrude from the sash main body 14 and the door panel main body 12, whereby the workability in mounting the door glass 19 and the corner glass 15 can be improved.

In addition, since the reinforcement member 18 is weld secured to the sash main body 14 and the door panel main body 12, the reinforcement member 18 can integrally be provided between the sash main body 14 and the door panel main body 12 so that the utilization of the rigidity of the reinforcement member 18 can be ensured. Consequently, the rigidity of the door sash construction including flexural and torsional rigidities can be increased.

As shown in FIG. 2, according to the automotive door sash construction, since the joint portion 17 between the auxiliary sash 16 and the reinforcement member 18 is covered with the lip portion 39 of the run channel 25 provided on the auxiliary sash 16 for the door glass 19 and/or the cover portion 42 of the corner glass seal 26 provided on the auxiliary sash 16 for the corner glass 15, the joint portion 17 becomes invisible, whereby not only the external appearance of the vehicle 10 but also the internal appearance of the door trim be improved.

Figure 6:
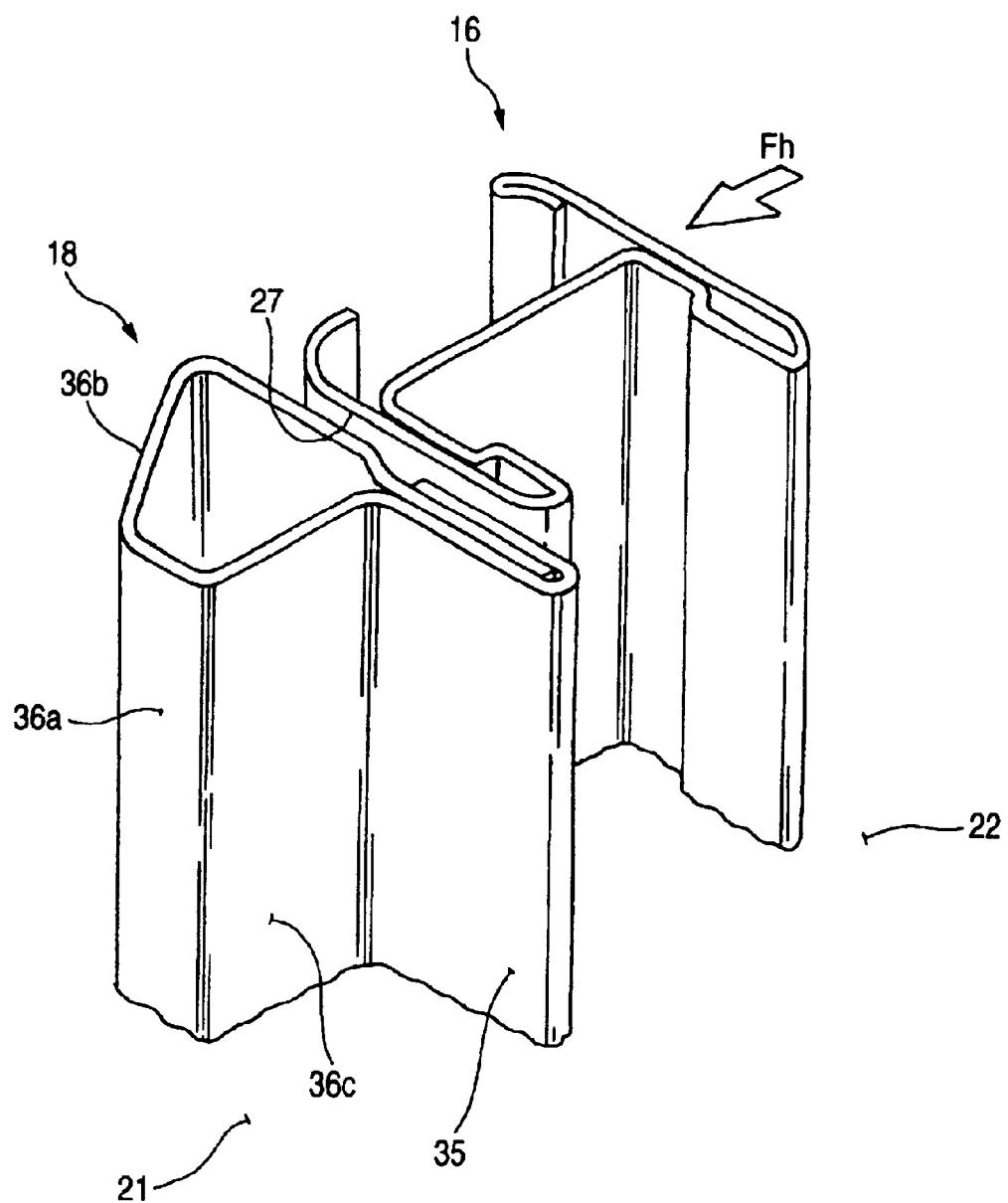
FIG. 6 is a functional view showing the automotive door sash construction according to the invention.

FIG. 6 is a functional view of the automotive door sash construction according to the invention.

Since the reinforcement member 18 is disposed along the auxiliary sash 16 in such a manner that the reinforcement member 18 is disposed either on the passenger compartment side 21 or the non-passenger compartment side 22 (not shown), the strength (modulus of section) against in particular a force Fh from the side can be increased.

Consequently, the auxiliary sash 16 can be strengthened against the force Fh from the side, and the rigidity of the door sash construction can also be increased.

In addition, while the auxiliary sash 16 and reinforcement member 18 according to the embodiment of the invention which is shown in FIG. 6 are described as being separate members, the reinforcement member 18 may be formed integrally with the auxiliary sash 16 when the latter is formed so that the auxiliary sash 16 and the reinforcement member 18 are formed simultaneously with the plate portion 35 of the reinforcement member 18 being provided integrally with the inboard portion 27 of the auxiliary sash 16.

While the top and bottom end portions of the reinforcement member 18 are both welded, the top end portion may be bolted instead of being welded. Alternatively, the bottom end portion may be bolted instead of being welded.

While the fillet welds are used in welding the reinforcement member 18, any welding methods may be adopted, and for example, spot welding may be used.

While only certain embodiments in the invention have been specifically described herein, it will apparent that numerous modifications may be made thereto without departing from the spirit and scope of the invention.

Being constructed as has been described heretofore, the invention can exhibit the following advantages.

According to the first aspect of the invention, since the reinforcement member which is disposed along the auxiliary sash is disposed either on the passenger compartment side or on the non-passenger compartment side of the auxiliary sash, the longitudinal dimension or the width of the auxiliary sash can be reduced. Consequently, the field of view from the passenger compartment can be improved.

According to the second aspect of the invention, since the reinforcement member is disposed on the passenger compartment side of the auxiliary sash, not only can the external surface of the vehicle be flushed but also the external appearance of the vehicle can be improved.

In addition, since the reinforcement member is disposed on the passenger side of the auxiliary sash, the internal appearance of the door trim can also be improved by designing the configuration of the reinforcement member as wished.

According to the third aspect of the invention, since the reinforcement member is secured to the sash main body and/or the door panel main body through welding, there is eliminated a case where fixing members as well as bolts and nuts protrude from the sash main body and/or the door panel main body, and therefore, the workability in mounting the door glass and the corner glass can be improved.

In addition, since the reinforcement member is secured to the sash main body and/or the door panel main body through welding, the reinforcement member can be provided integrally between the sash main body and the door panel main body to ensure the utilization of the rigidity of the reinforcement member. Consequently, not only can the auxiliary sash be reinforced strongly but also the rigidity of the door sash construction can be increased.

According to the fourth aspect of the invention, since the joint portion between the auxiliary sash and the reinforcement member is covered with the run channel provided on the auxiliary sash for the door glass and the corner glass seal provided on the auxiliary sash for the corner glass, the joint portion becomes invisible, thereby improving not only the external appearance of the vehicle but also the internal appearance of the door trim.

What is claimed is:

1. An automotive door sash construction comprising:
   a sash main body attached to a door panel main body;
   an auxiliary sash provided on said sash main body for holding a corner glass; and
   a reinforcement member disposed along said auxiliary sash, wherein said reinforcement member is disposed on either a passenger compartment side or a non-passenger compartment side of said auxiliary sash, wherein said reinforcement member has a closed cross section, and wherein said reinforcement member and said auxiliary sash are separate members, and a predetermined gap is provided between said auxiliary sash and said reinforcement member.

2. The automotive door sash construction according to claim 1, wherein said reinforcement member is disposed on the passenger compartment side of said auxiliary sash.

3. The automotive door sash construction according to claim 1, wherein said reinforcement member is secured to at least one of said sash main body and said door panel main body through welding.

4. The automotive door sash construction according to claim 1, wherein a joint portion between said auxiliary sash and said reinforcement member is covered with a run channel for a door glass provided on said auxiliary sash.

5. The automotive door sash construction according to claim 1, wherein a joint portion between said auxiliary sash and said reinforcement member is covered with a corner glass seal for the corner glass provided on said auxiliary sash.

6. An automotive door sash construction according to claim 1, wherein said auxiliary sash has a substantially H-shaped cross section defining a front recessed portion in which a corner glass seal is fitted and a rear recessed portion in which a run channel is fitted, and wherein the width of said auxiliary sash in the longitudinal direction is substantially the same as the width of said reinforcement member.

7. An automotive door sash construction according to claim 6, wherein said reinforcement member has a b-shape cross section.

8. An automotive door sash construction according to claim 1, wherein said auxiliary sash defines a first recessed portion holding the corner glass and a second recessed portion for holding a door glass.

* * * * *